Oct. 3, 1967

R. E. GILCHRIST ET AL 3,344,858

PRODUCTION OF OIL BY AQUEOUS DRIVE WITH
SURFACTANT FORMED IN SITU
Filed Sept. 2, 1965

INVENTORS
R. E. GILCHRIST
R. J. SONNENFELD

*Young & Quigg*

ATTORNEYS

3,344,858
PRODUCTION OF OIL BY AQUEOUS DRIVE WITH SURFACTANT FORMED IN SITU
Ralph E. Gilchrist and Richard J. Sonnenfeld, Bartlesville, Okla., assignors to Phillips Petroleum Company, a corporation of Delaware
Filed Sept. 2, 1965, Ser. No. 484,557
14 Claims. (Cl. 166—9)

ABSTRACT OF THE DISCLOSURE

In producing oil from an oil-bearing stratum penetrated by an injection well and a production well, a slug of an aqueous alkali solution capable of forming surfactant with an organic acid is injected into the stratum thru the injection well, thereafter a slug of surfactant-forming organic acid dissolved in a light hydrocarbon is injected so as to cause mixing of the alkali and acid adjacent the interface of the slugs to form surfactant, the resulting liquids including the surfactant formed in situ are driven thru the stratum toward the production well to displace oil into the production well, and the produced oil is recovered from the production well.

---

Figure 1:
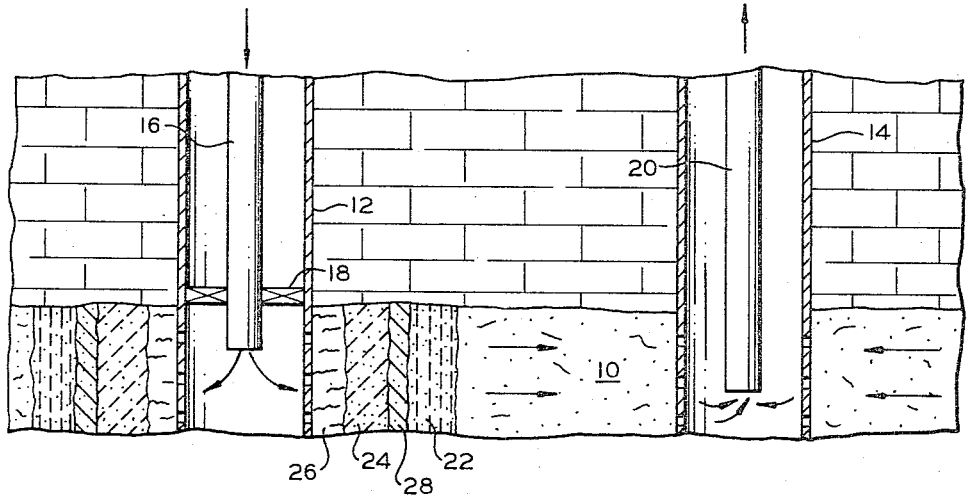

This invention relates to an improved process for producing oil from oil-bearing stratum by aqueous drive, such as water flooding or steam flooding.

Water flooding and steam flooding of oil reservoirs to recover oil therefrom have become conventional processes in the petroleum industry. Also, the use of surfactants in the aqueous driving fluid is an accepted technique.

A proposed secondary recovery process for recovering residual oil from a reservoir comprises forming soap or surfactant in situ by first injecting a slug of acid capable of forming a soap when reacted with an alkali, said acid being dissolved in a hydrocarbon, and thereafter injecting an aqueous alkali solution as the other soap-forming material and as the driving medium for driving the soap solution thru the stratum to displace the residual oil. While this process produces oil effectively, it is uneconomical in the use of alkali as the driving agent. Another disadvantage in the prior art process just described lies in the fact that the process requires the use of oil-miscible hydrocarbons as the carrier for the soap-forming acid and these oil-miscible hydrocarbons are unusually prone to fingering, thereby resulting in injecting the acid deep into the stratum in some areas and shallow in others so that the following alkali avoids contacting substantial quantities of the injected acid. Patents which emphasize the fingering effect of light oil-miscible hydrocarbons when injected into an oil-bearing stratum include Weinaug et al. 2,867,277, Draper 2,927,637, Habermann 3,139,929, and Habermann 3,167,118.

The present invention is concerned with an improved process for producing oil from an oil-bearing stratum which overcomes the disadvantages just pointed out.

Accordingly, it is an object of the invention to provide an improved process for producing hydrocarbons from an oil-bearing stratum by aqueous fluid displacement or flooding using a surfactant formed in situ. Another object is to provide an improved oil recovery process which is more effective and more economical than similar processes heretofore known. A further object is to provide a process which utilizes both a surfactant and $CO_2$ in recovering oil by aqueous fluid drive. Other objects of the invention will become apparent to one skilled in the art upon consideration of the accompanying disclosure.

A broad aspect of the invention comprises injecting a slug of aqueous alkali solution into a stratum thru an injection well and following this slug with a slug of organic acid which forms a soap or surfactant with the injected alkali solution, and thereafter driving the injected fluids thru the stratum to a well with an aqueous driving fluid so as to displace oil from the stratum, adn recovering the produced oil from the well. The aqueous driving fluid used in the process is water or steam, both of which are relatively inexpensive as compared with other driving media. In preferred practice, the injected fluids and surfactant formed in situ are driven to an offset production well with either steam or water.

Hence, the preferred process of the invention as applied to an oil-bearing stratum penetrated by an injection well and a production well comprises injecting into the stratum thru the injection well a slug of an aqueous alkali solution capable of forming surfactant with the acid of the following step, thereafter, injecting a slug of surfactant-forming organic acid dissolved in a light hydrocarbon so as to cause mixing of the alkali and acid adjacent the interface of the slugs to form surfactant, driving the surfactant thus formed thru the stratum toward a production well to displace oil thereinto, and recovering the produced oil from the production well.

In another embodiment of the invention, the formulation of surfactant in situ is utilized in a "huff and puff" steam drive wherein the aqueous alkali slug is first injected, followed by the injection of the acid either dissolved in a hydrocarbon or injected with steam. Steam is then used as the driving agent and steam injection is continued until substantial steam pressure is built up in the reservoir or stratum. In some strata it is good practice to maintain the surrounding production wells closed in during the early phases of the operation so as to ensure building up of reservoir pressure. After a soaking period of about 1 to several days, the pressure on the injection well is reduced so as to effect a high differential pressure between the stratum and the injection well, thereby causing the injected fluids and surfactant formed in situ to move toward and into the injection well. This movement of the injected fluids, and particularly the surfactant, thru the stratum displaces oil therefrom which is recovered by conventional means from the injection well. The procedure is then repeated with injection of alkali, acid, and steam to force the resulting soap deeper into the stratum and then reducing the pressure on the injection well to cause the soap and injected fluids to move to the injection well with production of oil therein. After continued repetition of the "huff and puff" process, direct drive of the surfactant formed in situ and injected fluids to the surrounding production wells is effected, thereby producing oil in the production wells.

It is also feasible to inject a slug of alkali and a slug of fatty acid once a day or once a week into the injection well during the "huff" phase of the steam injection process. The surfactant produced in accordance with the invention is water soluble and stands up under steam temperatures up to at least 600° F. which is a safe temperature within the stratum during steam injection at even higher temperatures. The aspect of the invention in which steam is used as the driving fluid is advantageous in higher gravity sands, heavy oil sands, or in oil shales if the shale formation has been made permeable enough to allow steam injection. The invention should have application to tar sands such as those found in Missouri and elsewhere and in the Athabaska region of Canada.

The injection of the aqueous alkali slug and the fatty acid slug is effected by ordinary pumps at the well head. A buffer fluid such as hydrocarbon or water is injected between the two fluids to ensure mixing of the two reactants in the formation rather than in the wellbore as they are being pumped down the hole. The buffer liquid injected is usually in the range of .5 to several barrels.

In another embodiment of the invention, alternate slugs of aqueous alkali solution and a solution of the organic acid in relatively light liquid hydrocarbons are injected so as to build up several laminar sections of the injected fluids with surfactant being formed at the interface of the slugs, and then driving the resulting fluids thru the stratum to offset production wells so as to displace the oil from the stratum into the wells. In this technique of operation it is preferred to decrease the size or volume of the slugs of aqueous alkali solution and progressively increase the size or volume of the hydrocarbon solution containing the acid. This technique of operation is conducive to forming an oil-miscible phase of decreasing reservoir oil concentration from the first injected hydrocarbon slug to the last injected hydrocarbon slug which cooperates with the surfactant in displacing oil from the stratum. A similar technique is disclosed in U.S. Patent 3,191,675 to R. E. Gilchrist.

The aqueous alkali to be injected as the initial slug may use any of the usual soap-forming alkalis or bases such as the hydroxides and carbonates of sodium, potassium, and lithium and the ammonium carbonates and hydroxides. Also, strong organic bases and specifically amines may be utilized. These amines include ethylamine, triethanolamine, morpholine, isopropylamine, etc. The preferred alkalis are the carbonates because of the simultaneous production in situ of $CO_2$ when the alkali reacts with the acid in the stratum. $CO_2$ is known in the prior art as a good agent for increasing the effect of aqueous driving fluid in the recovery of oil from an oil-bearing stratum. Thus, the use of the carbonates has this distinct advantage over the use of other alkalis and sodium carbonate is preferred.

The amount of aqueous alkali slug to be injected is in the range of 0.01 to 0.2 pore volumes of the well pattern from which oil is to be produced (the sweep area of the drive). The concentration of the alkali in the aqueous slug is in the range of 0.001 to 1.25 weight percent of the water. Generally, a concentration of about 0.1 weight percent is preferred. The injected aqueous alkali slug should saturate a section of stratum extending out at least 2′ and up to 10′ from the injection well so that the concentration thereof does not decrease excessively as it is moved out radially from the well and necessarily thins out as it is driven deeper into the stratum by the following slug of acid.

The acid to be utilized for the soap-forming step of the process is preferably an organic carboxylic acid, particularly a monocarboxylic acid of about 6 to 40 carbon atoms. The saturated and unsaturated aliphatic acids of this class such as stearic, palmitic, oleic, lauric, etc. are preferred. Rosin acids including abietic or isomers of abietic acids are also effective in the process. In addition, other organic soap-forming acids including the naphthenic acids of about 7 to 40 carbon atoms are effective in the process. These acids, derived from various petroleum fractions in conventional manner, are commercially available.

When injecting the selected acid or acids with steam, the slug of steam containing the acid(s) is in the range of 0.1 to 0.6 pore volumes of the area of stratum to be produced and the concentration of the acid in the steam is in the range of 0.01 to 5 weight percent of the steam. It is to be understood that the acid is injected into the steam at the wellhead and that some of the acid is vaporized while some remains in liquid form, depending upon the particular acid used and the temperature of the steam. Steam temperatures in the range of 450 to about 700° F. are used and at these temperatures, a substantial proportion of the acid is vaporized and returns to liquid form in the stratum. In this manner the injected acid is effectively mixed with the previously injected alkali as the slugs are driven thru the stratum.

Suitable solvents for the organic acids range from LPG or propane to gas oil and include gasoline, kerosene, diesel oil, etc. The amount of propane slug injected is in the range of 0.005 to 0.05 pore volumes of the stratum to be produced by the drive. The concentration of the soap-forming acid in the hydrocarbon is in the range of 0.04 to 5 weight percent of the hydrocarbon.

Figure 2:
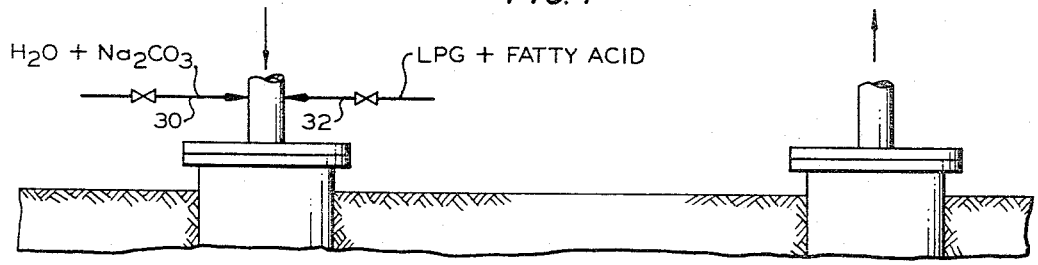
Figure 2:
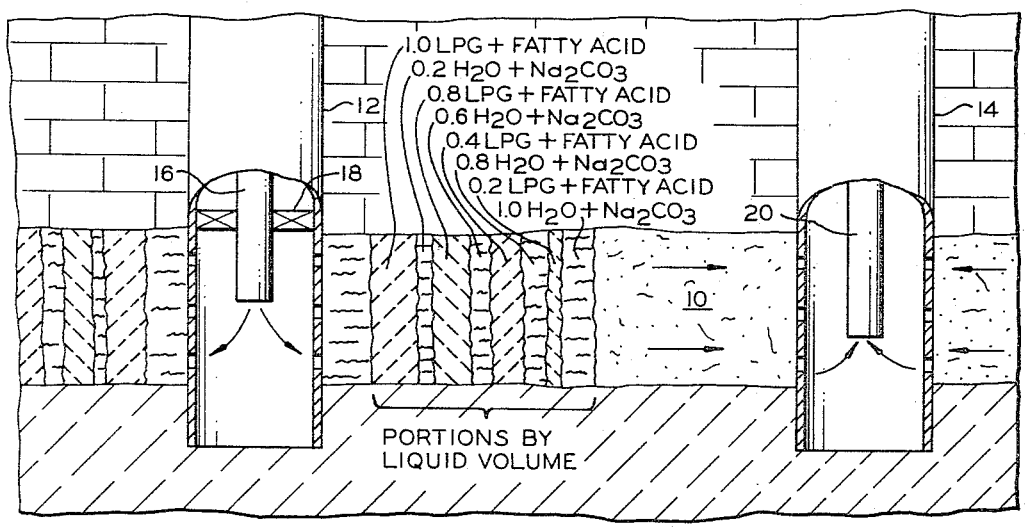

A more complete understanding of the invention may be had by reference to the accompanying schematic drawing of which FIGURE 1 is an elevation in partial section thru an oil-bearing stratum in which the process of the invention is applied and FIGURE 2 is a similar view illustrating another embodiment of the invention.

Referring to FIGURE 1, an oil-bearing stratum 10 is penetrated by an injection well 12 and a production well 14. Well 12 may represent a central well of a conventional ring pattern and well 14 represents one of the production wells in the ring. It may also be considered that wells 12 and 14 represent individual wells in parallel lines of injection and production wells with a second line of production wells on the opposite side of wells 12.

Injection tubing 16 in well 12 is provided with a packer 18 at its lower end to facilitate injection of the various slugs required in the process. Produced fluids are recovered from production well 14 thru tubing string 20 by pumping, gas lift, or any conventional method. The alkali slug 22, first injected, is followed by acid slug 24 which is in turn followed by aqueous driving fluid 26. The surfactant or soap formed by interaction of the alkali and acid at the interface is designated 28. As the slugs are driven thru the stratum, more soap or surfactant is formed by intermixing of the acid and alkali and the movement of the soap and injected fluids thru the stratum to the production well(s) 14 displaces oil from the stratum and forces same into the production wells from which it is recovered.

Referring to FIGURE 2, a similar arrangement of wells is shown, corresponding parts being numbered corresponding to FIGURE 1. This figure illustrates that aspect of the process wherein the acid is incorporated in a hydrocarbon such as LPG and alternate slugs of alkali and hydrocarbon solution containing acid are injected with the volume of the slugs of alkali progressively decreasing and the alternate slugs of hydrocarbon solution progressively increasing in volume from the first injected to the last. To illustrate, designating the first injected slug of aqueous alkali as a volume of 1 unit and the last injected slug of LPG and fatty acid as 1 unit, the slugs of alkali progressively decrease .2 of a volume and the slugs of LPG and acid, starting with .2 volume with the first slug progressively increase .2 volume so that the last slug amounts to 1 unit volume comparable to the first injected slug of aqueous alkali. While the presence of surfactant is not shown at the various interfaces of the alkali and acid, it is to be understood that surfactant is formed at these interfaces.

The aqueous alkali slug is injected into tubing 16 thru line 30 and the hydrocarbon-acid slug thru line 32.

While FIGURE 2 shows the slugs progressively increased and decreased, it is within the scope of the invention to use alternate slugs of hydrocarbon-acid of the same size with corresponding or different sizes of aqueous alkali slugs.

The invention has several distinct advantages over prior art processes. The alkali solution is injected, first, in relatively small volume compared with prior art techniques and the acid slug is injected as a pusher for the alkali slug, also in relatively small volume. The injection of the alkali, first, substantially avoids the fingering experienced when the hydrocarbon slug containing the acid is injected first. Another advantage of the disclosed process lies in the use of ordinary aqueous driving fluid such as steam or water, thereby avoiding expensive driving fluid such as the aqueous alkali solution of the prior art process referred to above. Further, the injection of a small volume of buffer liquid for the slugs of alkali and acid prevents mixing prematurely in the injection tubing with resultant formation of surfactant before entry into the formation. A further advantage is in the simultaneous formation of both surfactant and $CO_2$ in situ, each of which contributes to the recovery of additional oil in a fluid drive process. In other words, the process produces more oil at a lower cost that if $CO_2$ and a surface active agent were added or injected at the surface prior to the injection of aqueous driving fluid such as steam and water.

Certain modifications of the invention will become apparent to those skilled in the art and the illustrative details disclosed are not to be construed as imposing unnecessary limitations on the invention.

We claim:

1. A process for producing oil from an oil-bearing stratum comprising the steps of:
   (1) injecting into said stratum thru a well therein a slug of an aqueous alkali solution capable of forming surfactant wth the acid of step (2);
   (2) thereafter, injecting a slug of surfactant forming organic acid dissolved in a light hydrocarbon, so as to cause mixing of said alkali and acid adjacent the interface of the slugs to form surfactant;
   (3) driving the surfactant formed in step (2) thru said stratum toward a production well to displace oil into said production well; and
   (4) recovering the produced oil from said production well.

2. The process of claim 1 wherein the acid of step (2) is a member of the group consisting of fatty acids, rosin acids, and mixtures thereof.

3. The process of claim 2 wherein said alkali is an alkali metal carbonate and $CO_2$ is formed in situ so as to aid in the displacement of oil.

4. The process of claim 1 wherein steam is injected in step (3) as the driving agent to build up substantial steam pressure in said stratum and, after a soaking period, pressure is reduced on the injection well so as to allow the resulting pressure differential to move stratum liquids, including surfactant and crude oil into said well; and the injection steps, soaking, and production step are repeated.

5. The process of claim 4 wherein the alkali is a carbonate so that $CO_2$ is produced in situ as an aid in displacing oil.

6. A process for producing oil from an oil-bearing stratum penetrated by at least one well which comprises the steps of:
   (1) injecting into said stratum thru said well a slug of an aqueous alkali solution capable of forming a surfactant with the acid of step (2);
   (2) following step (1), injecting a slug of an organic acid, capable of forming a surfactant when mixed with the alkali of step (1), into said stratum thru said well in admixture with one of steam and a light hydrocarbon so as to intermix said acid and said alkali to produce surfactant in solution in stratum liquids;
   (3) injecting flood water into said stratum following step (2) so as to move the solution of surfactant thru said stratum and displace oil therefrom; and
   (4) producing the displaced oil from a well in said stratum.

7. The process of claim 6 wherein in step (1) the concentration of alkali in the solution is in the range of 0.001 to 1.25 weight percent of the solution and the slug is in the range of 0.01 to 0.2 pore volumes, and in step (2), steam is used and the amount of steam is in the range of 0.1 to 0.6 pore volume and the acid is in the range of 0.01 to 5 weight percent of the steam.

8. The process of claim 7 wherein the said steam at a temperature in the range of 450 to 700° F. is used in step (2) to carry the acid into the stratum.

9. The process of claim 6 wherein said light hydrocarbon comprises liquid propane is used to carry the acid into the stratum.

10. The process of claim 6 wherein in step (1) the concentration of alkali in the solution is in the range of 0.001 to 1.25 weight percent of the solution and the slug is in the range of 0.01 to 0.2 pore volumes, and in step (2), hydrocarbon is used and the amount of hydrocarbon is used and the amount of hydrocarbon is in the range of 0.005 to 0.05 pore volume and the acid is in the range of 0.04 to 5.0 weight percent of the hydrocarbon.

11. A process for producing oil from an oil-bearing stratum penetrated by an injection well and a production well comprising the steps of:
   (1) injecting thru said injection well into said stratum alternate slugs of an aqueous alkali solution and a solution of an organic acid, which forms a surfactant with said alkali under conditions in said stratum, in a light hydrocarbon;
   (2) successively increasing the volume of the slugs or organic acid solution and successively decreasing the volume of the slugs of alkali solution of step (1);
   (3) thereafter, injecting aqueous flooding medium into said stratum thru said injection well so as to drive thru said stratum toward said production well the injected fluids and surfactant produced by mixing the acid and alkali in situ, thereby displacing oil from said stratum into said production well; and
   (4) recovering produced oil from said production well.

12. The process of claim 11 wherein said alkali is a carbonate and $CO_2$ is formed in situ along with surfactant.

13. The process of claim 12 wherein said carbonate is sodium carbonate.

14. The process of claim 11 wherein said hydrocarbon comprises principally propane and said alkali is sodium carbonate.

References Cited

UNITED STATES PATENTS

| | | | |
|---|---|---|---|
| 2,875,831 | 3/1959 | Martin et al. | 166—9 |
| 3,036,631 | 5/1962 | Holbrook | 166—9 |
| 3,047,062 | 7/1962 | Meadors | 166—9 |
| 3,111,984 | 11/1963 | Reisberg | 166—9 |
| 3,111,985 | 11/1963 | Reisberg | 166—9 |
| 3,174,542 | 3/1965 | Reisberg | 166—9 |
| 3,185,214 | 5/1965 | Bernard et al. | 166—9 |
| 3,191,675 | 6/1965 | Gilchrist | 166—9 |
| 3,298,436 | 1/1967 | McCardell | 166—9 |
| 3,302,711 | 2/1967 | Dilgren | 166—9 |

ERNEST R. PURSER, *Primary Examiner.*

I. A. CALVERT, *Assistant Examiner.*